Nov. 25, 1969 J. W. SELLNER Re. 26,725

COMBINED RECLINING EXERCISING AND MASSAGING DEVICE

Original Filed Dec. 16, 1963

2 Sheets-Sheet 1

John W. Sellner

INVENTOR.

COMBINED RECLINING EXERCISING AND MASSAGING DEVICE

Original Filed Dec. 16, 1963 2 Sheets-Sheet 2

John W. Sellner

INVENTOR.

United States Patent Office

Re. 26,725
Reissued Nov. 25, 1969

26,725
COMBINED RECLINING EXERCISING AND MASSAGING DEVICE

John W. Sellner, 10246 Silverton Ave., Tujunga, Calif. 91042

Original No. 3,315,666, dated Apr. 25, 1967, Ser. No. 331,025, Dec. 16, 1963. Application for reissue Mar. 13, 1969, Ser. No. 808,027
Int. Cl. A61h *15/00*
U.S. Cl. 128—57 5 Claims

Matter enclosed in heavy brackets [ ] appears in the original patent but forms no part of this reissue specification; matter printed in italics indicates the additions made by reissue.

*ABSTRACT OF THE DISCLOSURE*

*A reclining and exercising device having a double M-shaped adjustable base and a pair of pivotally interconnected body supporting frame members supported within the base member by flexible members pivotally mounted on each side of the base member.*

This invention relates to reclining and exercising devices and refers more particularly to such a device actuated by the individual user thereof, or power driven, as may be desired, said device being operable to various positions for use as a body supporting, exercising and massaging device.

More specifically it refers or relates to an attachment to said apparatus, and forming part thereof, which upon activation of the apparatus, will massage portions of the human body during stretching and exercising of the body upon the apparatus, whether self administered or activated by suitable power driven means, whichever may be desired.

The invention also specifically refers to improvements in construction and assembly of the device whereby stability of the supporting elements is assured, better balance effected, and smoother operation of the entire combined apparatus thus attained.

A further object of the invention is the provision of means whereby the device may be assembled or unassembled for use with a minimum of time and effort.

These objects as well as others may be better comprehended in the course of the following description of an apparatus embodying the invention and taken in connection with the accompanying drawings in which.

Figure 1:
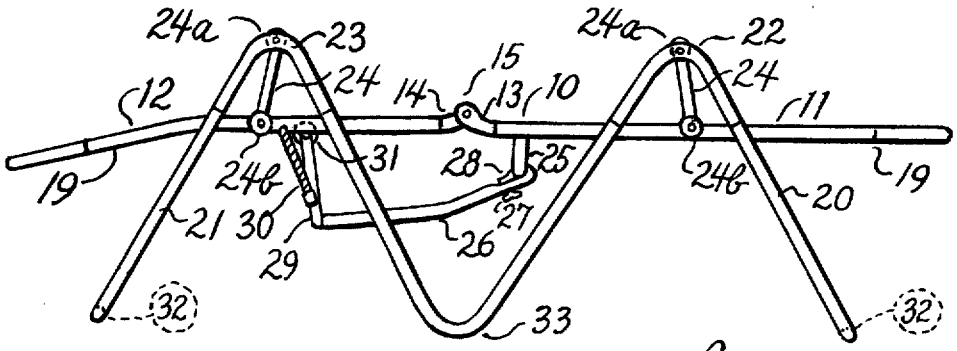
FIGURE 1 is a side elevational view of a body supporting, exercising and massaging device in accordance with the invention.
Figure 2:
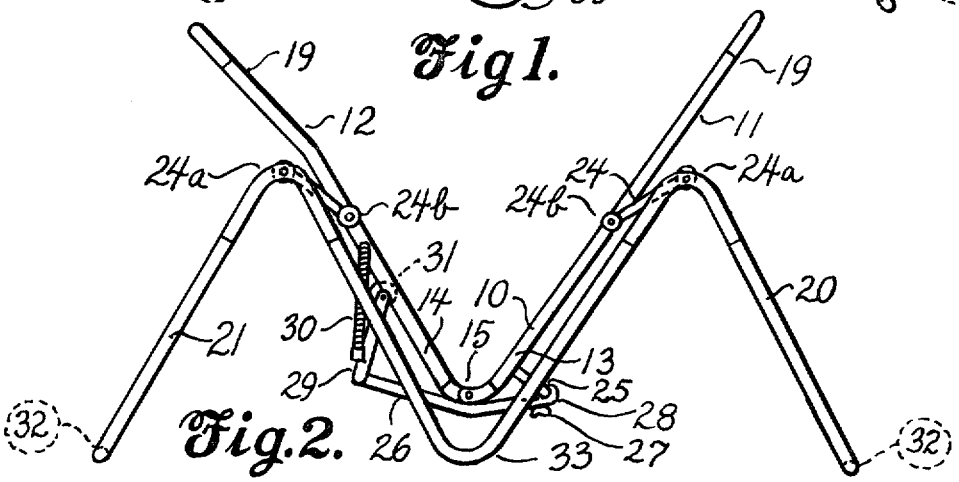
FIGURE 2 is a side elevational view of the device showing the members thereof in an attitude of use different from FIGURE 1.
Figure 3:
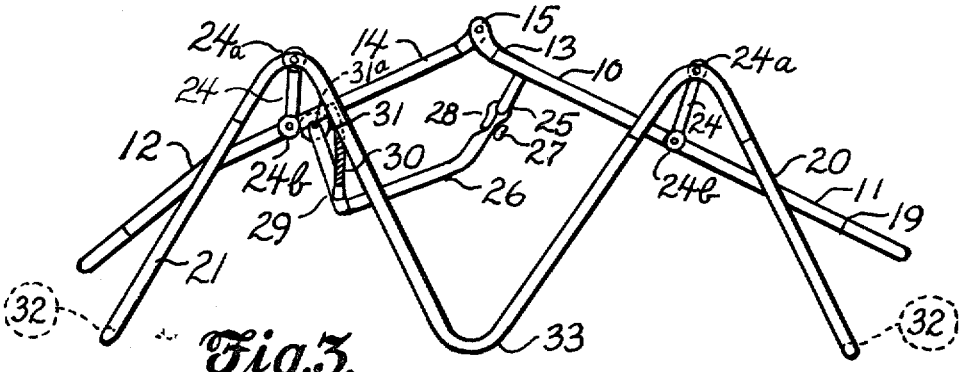
FIGURE 3 is a side elevation showing the members of the device in still another attitude of use.
Figure 4:
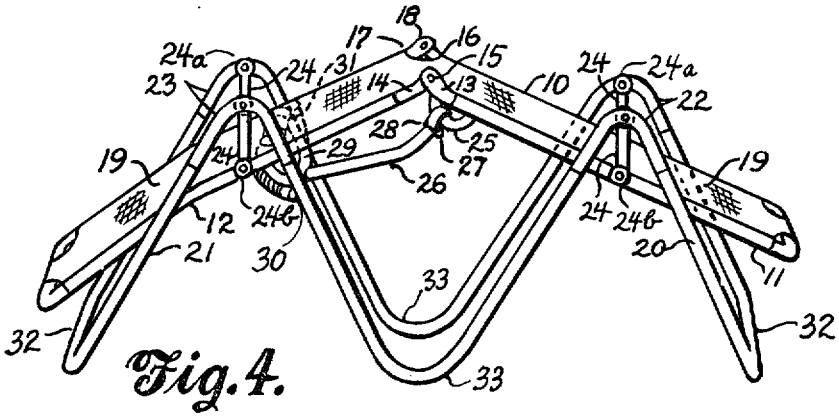
FIGURE 4 is a perspective view of the device embodying the invention.

In FIGURES 1, 2, 3, 4 and 6, there is illustrated a reclining and body exercising apparatus 10, in which are shown the body supporting elements of the apparatus including tubular frame sections 11 and 12 pivotally secured together at their flattened end points 15 at the center of the entire body supporting section. In greater detail in FIGURE 4, ends 13 and 14 of frame sections 11 and 12, hinged at 15 are shown, as well as ends 16 and 17 of frame sections 11 and 12, hinged at 13.

A canvas or other suitable flexible covering 19 is stretched over the frame composed of elements 11 and 12, and is held in place thereon by clamps or other securing means (not shown) as may be available.

Pivotally interconnected frame sections 11 and 12 are mounted in tubular base members 20 and 21, by flexible members or slings 24—24 below the apexes 22 and 23 of said base members to afford a lower center of gravity of the entire assembly, and thus insuring greater stability thereto. These strap slings or members 24—24 have, in the apparatus as here illustrated, bearings at each end indicated at 24a and 24b. Although this strap member has been found to be effective, applicant does not wish to limit himself to the specific construction as shown, as chains or other flexible supports may be employed.

The tubular base members 20–21 are so formed and shaped as to be spaced apart laterally at 32—32 and longitudinally at 33—33 to form a tapered double M shape and thus assure a maximum of stability to the entire assembly.

Figure 6:
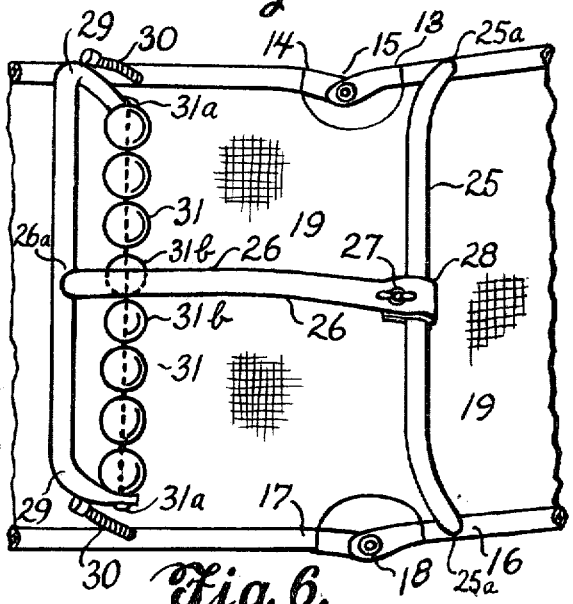
FIGURE 6 is a perspective view taken from below the device of that portion of the assembly embodying the massaging element.

Below one end of the body supporting frame at 13 and 16, see FIGURE 6, and extending downward in an arc therefrom, is a member 25, secured by welding or otherwise to frame ends 13 and 16. To this arched member 25 is pivotally secured at 28 by adjustable member 27, a curved rod or pipe member 26, which extends past the junction of the frame sections at points 15 and 18, and has its forward end rigidly secured to the center of a U-shaped member 29 at point 26a. This U-shaped member is flexibly secured to sections 14 and 17 of the body supporting frame by springs 30—30 in such a manner as to exert sustained pressure of the U-shaped member and a plurality of soft sponge rubber balls 31–31b supported between the upper ends of the U-shaped member on rod 31a, against the underside of the flexible cover 19, so that in operation of the exercising portion of the apparatus, more specifically, the reciprocating movement of the body supporting member, the massaging assembly will be actuated to massage those portions of the operator's body resting over the point of contact of the rubber balls with the underside of the fabric cover 19. It has been found practical to have the balls 31—31 of larger diameter than the balls 31b—31b, so that in use the massaging action will be accentuated adjacent the ends of the ball supporting rod 31a, and reduced adjacent the center of the rod. This arrangement provides greater massage manipulation on the muscles of the operator's back when said operator lies supine upon the body supporting member 10, with his back resting upon the covering fabric 19.

Figure 5:
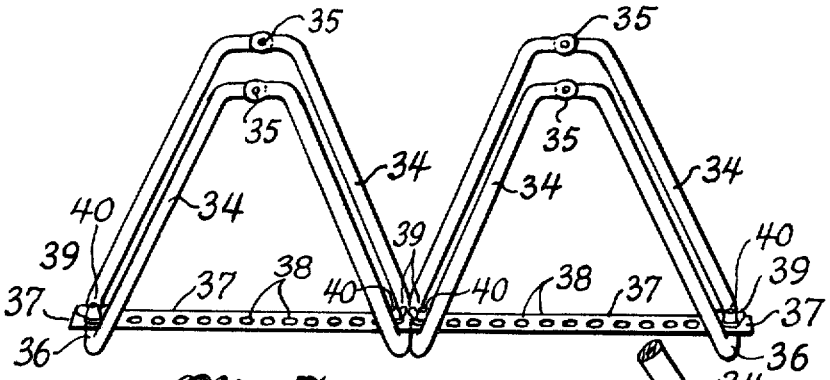
FIGURE 5 is a side elevation showing a modification of the supporting frame of the apparatus.
Figure 7:
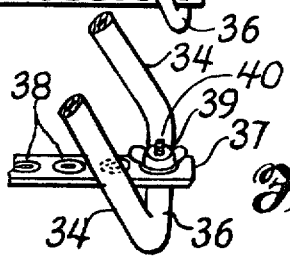
FIGURE 7 shows a detailed enlarged portion of the supporting frame illustrated in FIGURE 5.

In FIGURES 5 and 7, an alternative supporting section of the apparatus is shown composed of two inverted V-shaped tubular members 34—34, shaped as shown and hinged at points 35—35 to be movable longitudinally to elevate or depress the hinged portions of the members, and so conformed at the base 36—36 of the supporting members to rigidly form lateral spacing between the parallel sides of said members. A flexible band 37 is provided, having closely spaced grommets 38 therein, which are secured in base 36 over bolts 40—40 extending upward from the base, and secured thereon by thumb screws 39—39 in the desired position, and secured sufficiently to prevent longitudinal slippage of the base members, thus avoiding possible collapse.

The body supporting frame 10 may be secured by flexible members 24—24 from hinge points 35—35 in the same manner as it is suspended from the base assembly shown in FIGURE 1 through FIGURE 4.

The inverted V members are shown in FIGURES 5 and 7 in juxtaposition and secured by flexible band 37 so that they are equal in height from base to apex. The height may be varied between the adjacent members by increasing or decreasing the angle formed at the hinges 35—35, to allow one-half of this base assembly to be more elevated than the other half, and then secured in this position, by first adjusting the flexible band over the bolts and then securing the thumb screws in place.

What I claim is:

1. A combination body supporting, exercising and massaging device comprising a pair of pivotally interconnected body supporting frame members, a longitudinally adjustable base member, flexible members mounted pivotally on each side of said base member and securing said body supporting member within said base member, a massaging device comprising a supported curved member extended below and rigidly secured to each side of one of the body supporting members, an arched member below the other body supporting member and extending between the two sides of the other body supporting member, spring members connecting the ends of the arched member to the sides of the other body supporting member, a rigid rod having one end rigidly connected at one end to said arched member and at the other end pivotally connected to said curved member, a plurality of soft rubber balls of varying sizes mounted within said arched member and so arranged as to massage a human body resting upon the body supporting members when the device is actuated.

2. In a device of the character described, comprising two pivotally interconnected body supporting frame members, a double M-shaped base member, means within said base member to adjust same longitudinally, flexible means mounted pivotally on each side of said base member and securing the body supporting member within said base member, massaging means comprising a supported curved member extending below and rigidly secured to both sides of one of the body supporting members, an arched member below the other body supporting member and extending between the two sides of the other body supporting member, spring members securing the ends of the arched member to the sides of the other body supporting member, a rigid rod having one of its ends solidly secured to said arched member and its other end pivotally connected to said curved member, a plurality of sponge rubber balls of varying diameters mounted within said arched member and so arranged as to massage a human body resting upon the body supporting members when the device is actuated.

*3. A body supporting and exercising device comprising a pair of elongated frame sections disposed end-to-end and connected together at their adjacent ends to pivot relative to each other about a transverse axis, a base member adapted to rest on the floor and including a respective upwardly extending support adjacent an intermediate portion of each side of each frame section, a separate respective upwardly extending sling secured at its lower end to each side of a frame section, and means securing the upper end of each sling to a respective support so the frame sections are supported between and below the upper ends of the supports.*

*4. A device according to claim 3 in which each sling is secured at its ends to pivot about a transverse axis relative to the element to which the sling end is secured.*

*5. A body supporting and exercising device comprising a pair of elongated U-shaped frame sections disposed end-to-end with the open ends of the two frame sections secured together to pivot relative to each other about a transverse axis, a cover over the frame sections, a transverse upwardly opening U-shaped brace disposed under the frame sections, means securing each end of the U-shaped brace to at least one respective side of a frame section adjacent the pivot point of the two frame sections, a base member adapted to rest on the floor and including a respective upwardly extending support adjacent an intermediate portion of each side of each frame section, a separate respective upwardly extending sling secured at its lower end to each side of a frame section, and means securing the upper end of each sling to a respective support.*

References Cited

The following references, cited by the Examiner, are of record in the patented file of this patent on the original patent.

UNITED STATES PATENTS

| | | | |
|---|---|---|---|
| 2,874,689 | 2/1959 | Gavelik | 128—33 |
| 3,075,518 | 1/1963 | Sellner | 128—25 |
| 3,164,150 | 1/1965 | Reid | 128—57 |
| 3,005,633 | 10/1961 | Riemer | 272—58 |
| 3,043,591 | 7/1962 | Sellner | 272—58 |
| 3,075,518 | 1/1963 | Sellner | 128—25 |

L. W. TRAPP, Primary Examiner

U.S. Cl. X.R.

272—58

PO-1050
(5/69)

UNITED STATES PATENT OFFICE
CERTIFICATE OF CORRECTION

Patent No. Re. 26,725 Dated November 25, 1969

Inventor(s) John W. Sellner

It is certified that error appears in the above-identified patent and that said Letters Patent are hereby corrected as shown below:

Column 2, line 13, "These strap slings or members . . ." should read --These slings or strap members . . .--

SIGNED AND
SEALED
JUL 28 1970

(SEAL)
Attest:

Edward M. Fletcher, Jr.
Attesting Officer

WILLIAM E. SCHUYLER, JR.
Commissioner of Patents